US006360572B1

(12) United States Patent
Garnault

(10) Patent No.: US 6,360,572 B1
(45) Date of Patent: Mar. 26, 2002

(54) MOTOR VEHICLE OPENING LEAF HANDLE COMPRISING OPERATED DISENGAGEABLE MEANS FOR OPERATING A LOCK

(75) Inventor: Joël Garnault, Sannois (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/614,882

(22) Filed: Jul. 12, 2000

(30) Foreign Application Priority Data

Jul. 16, 1999 (FR) ........................................... 99 09227

(51) Int. Cl.$^{7}$ ........................... B60R 25/10; G06F 7/04

(52) U.S. Cl. ............................ 70/257; 70/467; 70/422; 180/287

(58) Field of Search ....................... 70/257, 467, 279.1, 70/422, 360, 379 R, 141, 472; 180/287; 292/189, 197

(56) References Cited

U.S. PATENT DOCUMENTS 4,833,465 A * 5/1989 Abend et al. .......... 340/825.31
5,094,093 A * 3/1992 Ben-Asher ................... 70/278
5,621,251 A * 4/1997 Yamazaki .................. 307/10.2
5,732,580 A * 3/1998 Garnault et al. .............. 70/422
5,736,935 A * 4/1998 Lambropoulos ....... 340/825.69
5,844,470 A 12/1998 Garnault et al. ............ 340/426
5,937,065 A * 8/1999 Simon et al. .................. 380/9
6,089,057 A * 7/2000 Spurr .......................... 70/264

FOREIGN PATENT DOCUMENTS

| | | |
|---|---|---|
| DE | 19724085 | 10/1998 |
| EP | 0831194 | 3/1998 |

* cited by examiner

*Primary Examiner*—Tan Nguyen
*Assistant Examiner*—Dalena Tran
(74) *Attorney, Agent, or Firm*—Liniak, Berenato, Longacre & White

(57) ABSTRACT

The invention relates to a handle (10) for operating an opening leaf of a motor vehicle comprising an operating lever handle (14) which is intended to be moved by the user from a position of rest into a position for opening, and a transmission member (22) which normally moves with the lever handle (14) from a position of rest into a position of opening and which is connected to a linkage (64) for operating a lock, wherein the transmission member (22) is connected to the lever handle (14) by means of a disengageable mechanism (49, 22, 68, 66), the engagement of which is brought about by the vehicle antitheft unit and which, in its disengaged state, stores up at least some of the mechanical energy of opening applied to the lever handle by the user so as then to restore this energy to the transmission member during engagement.

15 Claims, 8 Drawing Sheets

FIG.9
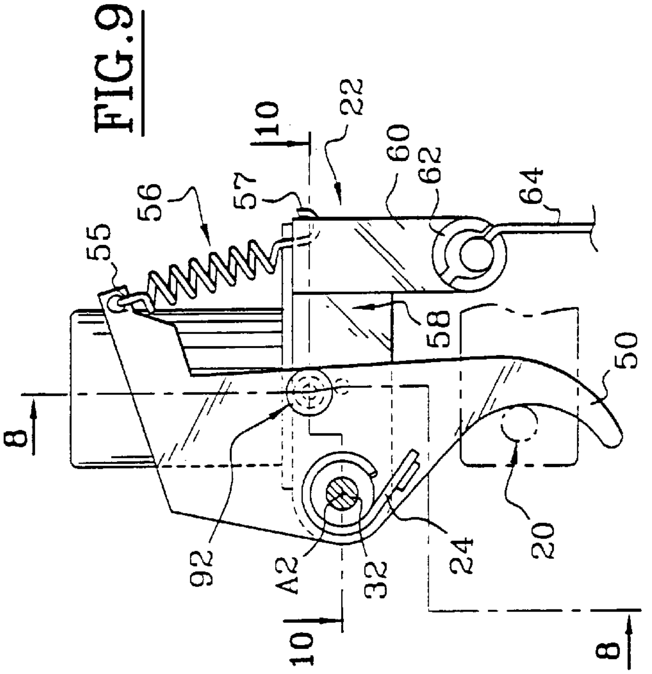
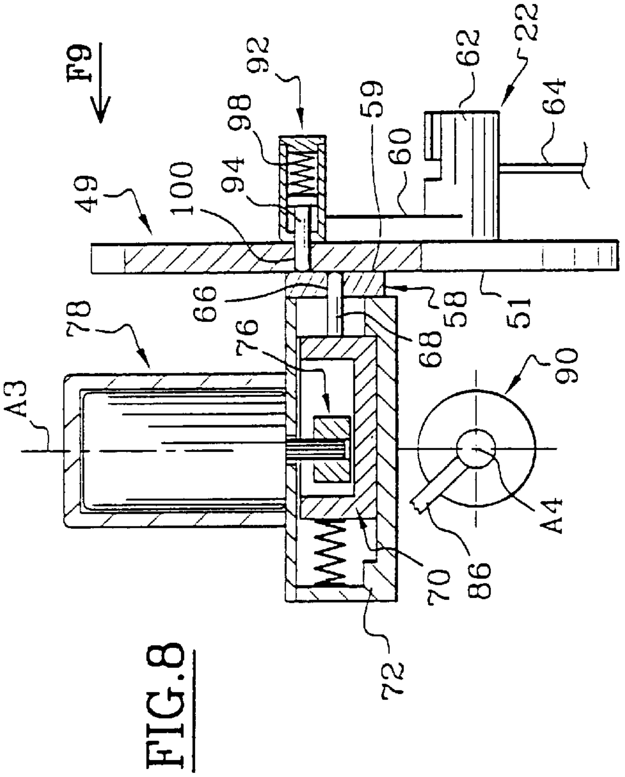
FIG.8
FIG.10
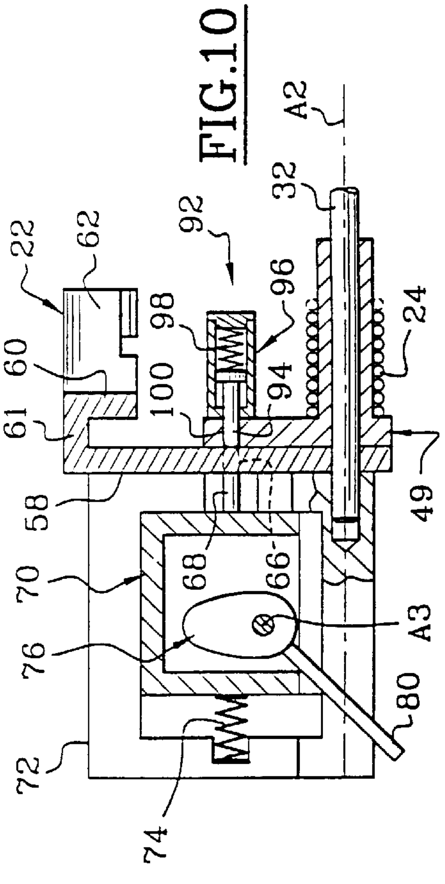

MOTOR VEHICLE OPENING LEAF HANDLE COMPRISING OPERATED DISENGAGEABLE MEANS FOR OPERATING A LOCK

BACKGROUND OF THE INVENTION

1. Field of the Invention

The invention relates to a motor vehicle handle.

The invention relates more particularly to a handle for operating an opening leaf of a motor vehicle, of the type in which the handle comprises an operating lever handle which is intended to be moved by a user from a position of rest into a position of opening, the movement of the lever handle being transmitted to a lock via a linkage comprising a transmission member, particularly an articulated transmission lever, which moves with the lever handle from a position of rest into a position of opening.

The invention relates more particularly to a handle for an opening leaf of a vehicle equipped with a security system which locks the opening leaf and the locking and unlocking of which are subordinated to a remote interrogation, by a vehicle antitheft unit, of a badge of the radio frequency type worn or carried by the user. The invention finds a more specific application in systems of the so-called "hands free" type.

2. Description of the Related Art

In systems such as this, before triggering unlocking, the antitheft unit emits an interrogation signal and waits for a coded response signal emitted by the badge to be returned. The antitheft unit compares the response signal received with a predetermined signal and, if the signals correspond, it then, at that instant, triggers the unlocking of the lock so that, by bringing the lever handle part of the handle into its position for opening, the user, duly authorized, can then open the opening leaf.

A security system such as this which makes it possible to get around the use of a key or a remote control, is often known as a "hands free access system".

In applications such as this, the procedure for the exchange of data between the antitheft unit and the identity badge, the stage of recognizing the response signal, then the actual operation of unlocking the lock take a certain amount of time.

Now, for such a security system to be convenient to use, it is important for the authorized user to be able to open the opening leaf as soon as possible after he has brought the lever handle part of the handle into its position for opening.

Hence, to this end, it has been proposed that the identification procedure be triggered as early on as possible from the time when, by bringing his hand up close to the lever handle or by moving the lever handle, the user makes known his desire to open the opening leaf.

A solution such as this proves insufficient because the overall duration of the identification procedure depends on other steps which follow on from its initiation.

SUMMARY OF THE INVENTION

The object of the present invention is therefore to propose a new design of handle which allows the user to rapidly achieve opening of the opening leaf after he has acted on the lever handle without him having to operate the lever handle twice, keeping his action applied to this lever handle so that it remains in a position for opening being enough to unlock the lock once the identification procedure has been completed, this new design having not in any way to impede the travel of the lever handle into its position for opening nor cause the user to have sensations other than those he would feel when manipulating the lever handle part of a handle of the state of the art, and this design having to be adaptable to a conventional handle without entailing any modification to the lock with its locking means and operating linkage.

To this end, the invention proposes a handle for operating an opening leaf of a motor vehicle, which is equipped with a security system which locks the opening leaf and the locking and unlocking of which are subordinated to a remote interrogation, by a vehicle antitheft unit, of an identifier, for example a badge of the radio frequency type, worn or carried by the user, and of the type in which, before triggering unlocking, the antitheft unit emits an interrogation system and waits for a response signal to be returned, the signal being emitted by the identifier, and which signal it compares with a predetermined signal and, if the signals correspond, then at that instant, triggers the unlocking, the handle comprising an operating lever handle which is intended to be moved by the user from a position of rest into a position for opening, and a transmission member which normally moves with the lever handle from a position of rest into a position of opening and which is connected to a linkage for operating the lock, wherein the transmission member is connected to the lever handle by means of a disengageable mechanism, the engagement of which is brought about by the antitheft unit when it detects said correspondence between the signals and which, in its disengaged state, stores up at least some of the mechanical energy of opening applied to the lever handle by the user so as to then restore this energy to the transmission member during engagement.

According to other features of the invention:

- the disengageable mechanism comprises a motorized finger for immobilizing the transmission member, which is made to move between a deployed forward disengagement position in which it immobilizes the transmission member, and a retracted rear engagement position in which the transmission member is free to move under the action of a spring that stores up energy and that connects the lever handle to the transmission member;
- the spring that stores up energy is a tension spring which is tensioned in order to store up energy when the immobilizing finger is in the deployed disengagement position and when the user moves the lever handle from its position of rest toward its position for opening;
- the front free end of the motorized immobilizing finger can be housed in a corresponding immobilizing hole in the transmission member;
- the transmission member is a transmission lever mounted in an articulated manner about a fixed spindle;
- the opposed free ends of the tension spring are each fixed to the end of a radial arm of the lever handle and of the transmission lever, respectively;
- the motorized finger that immobilizes the transmission lever is able to move in terms of translation in a direction parallel to the fixed spindle about which the transmission lever is articulated;
- the handle comprises indexing means which automatically secure the transmission member and the lever handle at the end of the security unlocking of the opening leaf;
- the automatic indexing means comprise an indexing finger borne by the lever handle and with respect to which it is mounted so that it can slide between a retracted forward position and a projecting rear position, toward which it is elastically returned, in which its rear free end can enter a corresponding indexing hole formed in the transmission member;

the immobilizing hole and the indexing hole consist of one and the same open hole formed in the transmission member and, when the lever handle is in the position of rest, causing the motorized finger that immobilizes the transmission member to move toward its deployed forward disengagement position, causes the indexing finger to slide toward its retracted forward position;

the motorized immobilizing finger is borne by an operating carriage mounted so that it can slide between two opposed positions toward one of which it is elastically returned, and the movements of the carriage are caused by a rotary operating cam which is rotated in both directions by an electric motor;

the operating carriage is returned elastically toward its extreme position that corresponds to the deployed forward disengagement position of the motorized immobilizing finger;

the handle is associated with a manual latch and a rotor for deploying the latch is capable of making the immobilizing finger move;

the lever handle is returned elastically toward its position of rest.

Other features and advantages of the invention will become apparent from reading the detailed description which follows, for an understanding of which reference will be made to the appended drawings, in which:

BRIEF DESCRIPTION OF THE DRAWINGS

FIGS. 8 to 10 are views similar to those of FIGS. 5 to 7, in which the lever handle is illustrated in a position for opening and the immobilizing carriage is in a forward disengaged position by immobilizing the articulated transmission lever in the position of,rest thereof;

DETAILED DESCRIPTION OF THE PREFERRED EMBODIMENTS

Figure 1:
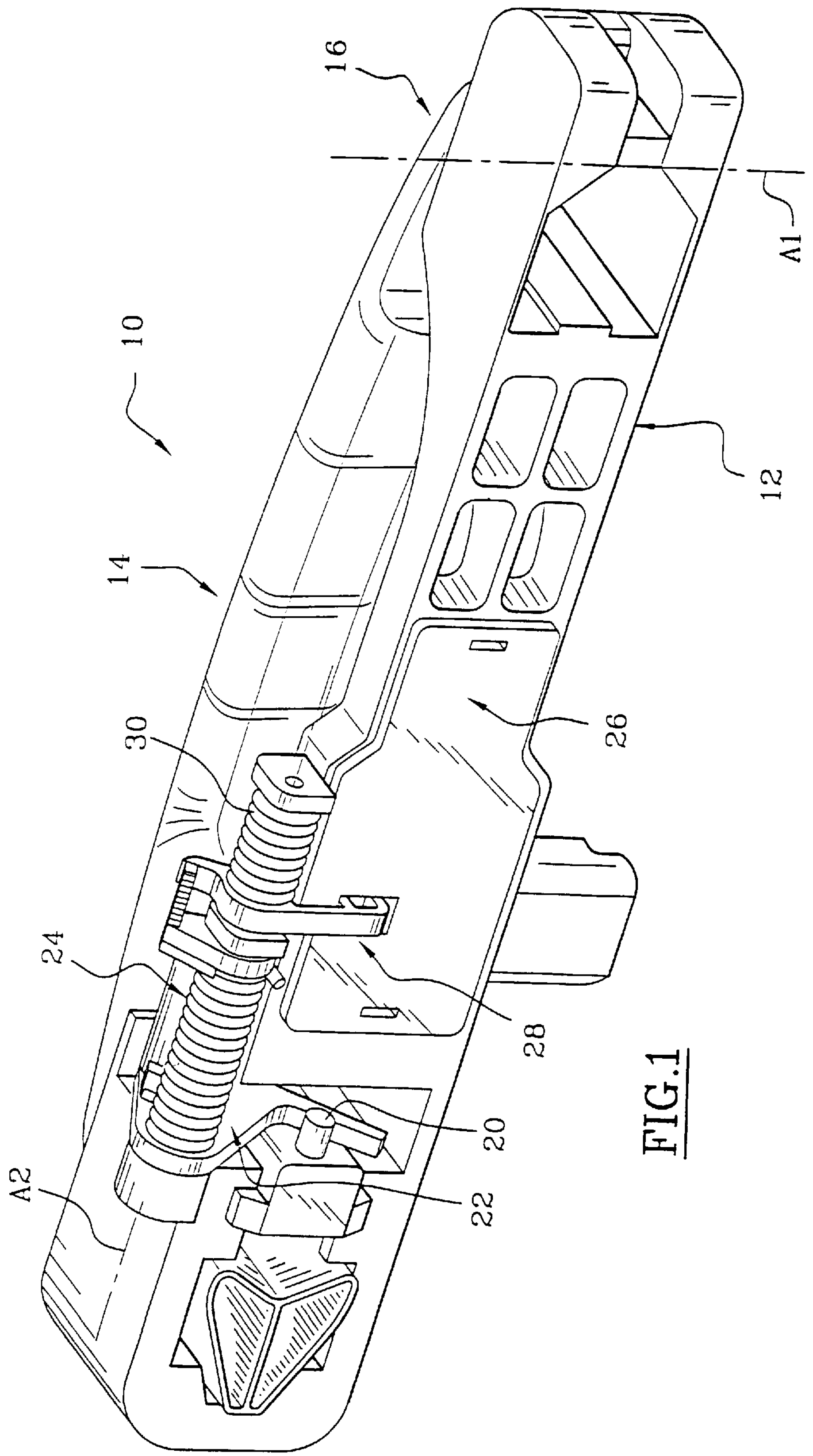
FIGS. 1 and 2 are perspective views illustrating a handle according to the state of the art, the lever handle part of this handle being illustrated respectively in the position of rest and in the position for opening.
Figure 2:
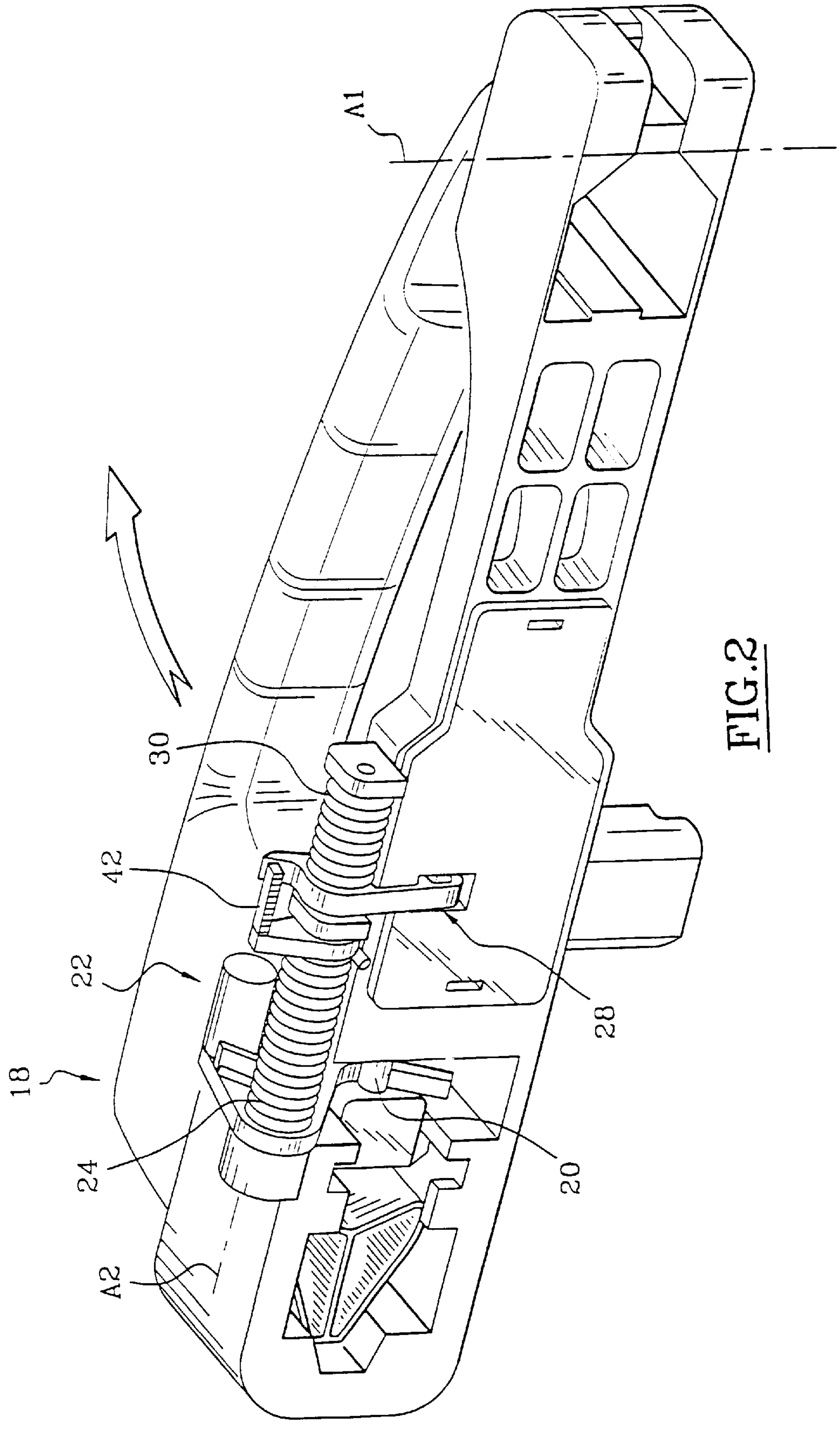
Figure 3:
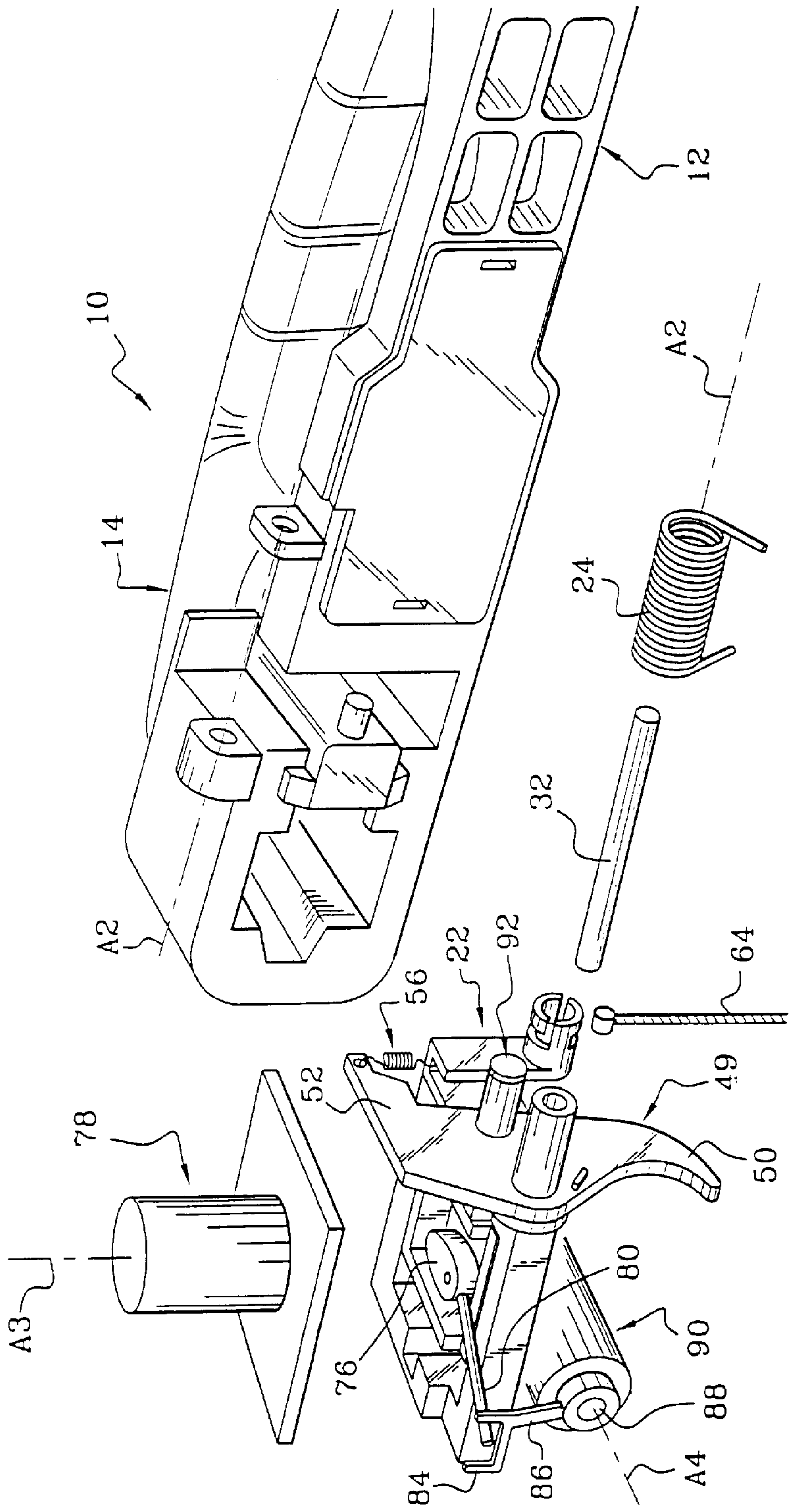
FIG. 3 is a diagrammatic partially exploded perspective view of the main components of the handle produced according to the teachings of the invention.
Figure 4:
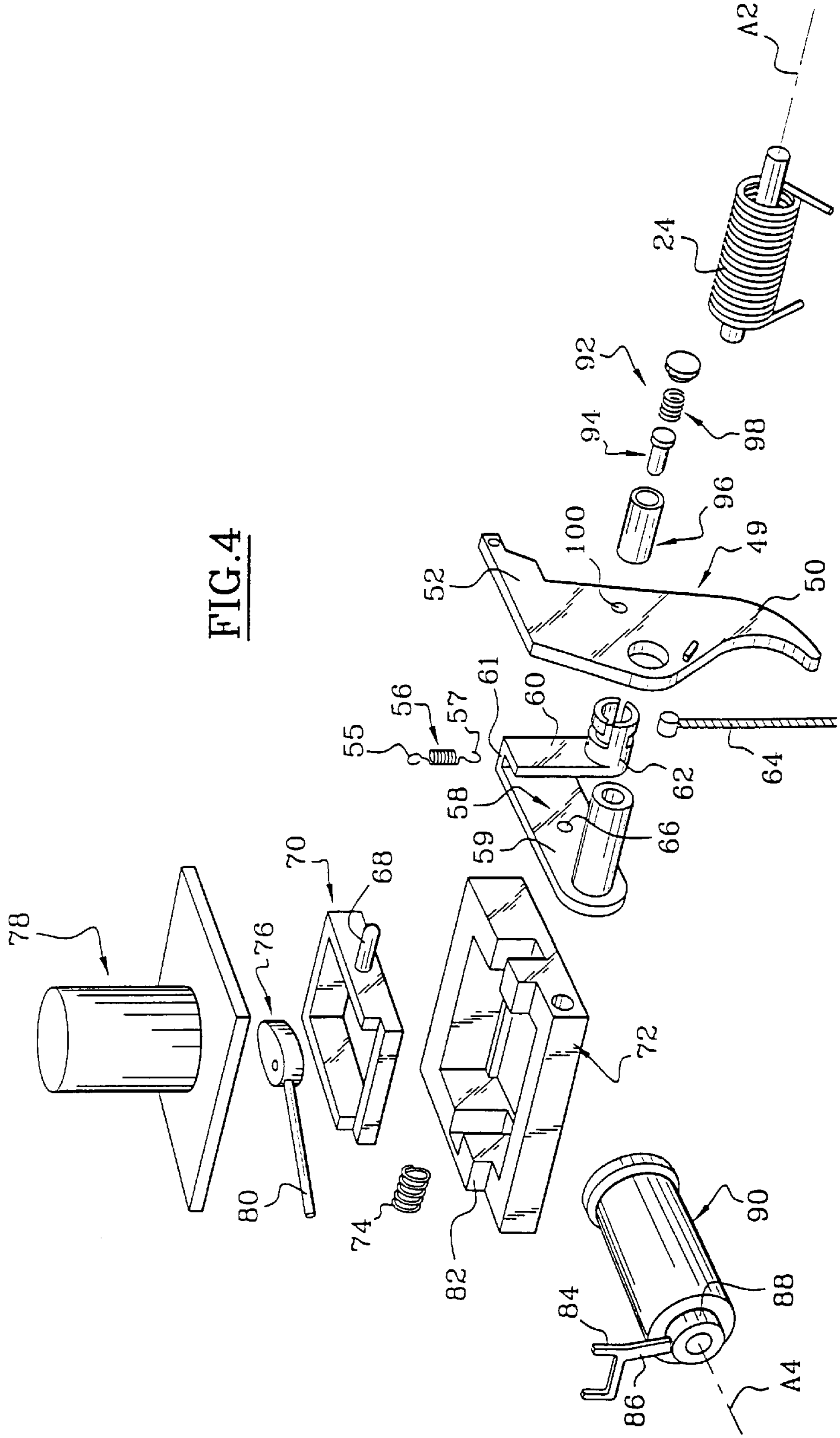
FIG. 4 is a view similar to that of FIG. 3, illustrating the main components of the handle according to the invention in greater detail and in exploded form.

FIG. 1 depicts a handle 10 according to the state of the art for a motor vehicle opening leaf which essentially comprises a handle support 12 intended to be arranged on the inside of a bodywork panel of the opening leaf, and an operating lever handle 14 which is intended to be arranged on the outside of the bodywork panel so that it can be brought by a user from a position of rest illustrated in FIG. 1 into a position of opening illustrated in FIG. 2.

In the embodiment illustrated, the operating lever handle is produced in the form of an operating bar 14 which extends in a longitudinal direction and which is articulated by its front end 16 to the support 12.

To make the text easier to understand, the ideas of “horizontal” and of “vertical” will be defined, by convention, as the way in which they appear in FIGS. 1 and 2, the longitudinal direction of the operating lever handle 14 therefore corresponding to the horizontal direction, and the vertical direction being represented by the axis Al of pivoting of the operating lever handle 14 with respect to the support 12, this axis Al generally being parallel to the bodywork panel of the opening leaf.

As can be seen particularly in FIG. 2, when the operating lever handle 14 is brought into its position for opening, its rear longitudinal end 18 becomes transversely offset outward with respect to the support 12 which remains stationary.

The rear end 18 of the operating lever handle 14 in this instance, via a peg 20, directly drives an articulated transmission member 22 which forms part of a linkage whereby the operating lever handle 14 can act on a lock that keeps the opening leaf in the closed position. The articulated transmission member 22 is articulated to the support 12 about a longitudinal axis A2. Thus, when the operating lever handle 14 is brought from its position of rest to its position for opening, the articulated transmission member 22 also pivots, about the axis A2, from a position of rest illustrated in FIG. 1 into a position of opening illustrated in FIG. 2. The rest of the linkage which operates the opening-leaf lock is not illustrated in FIGS. 1 and 2.

The articulated transmission member 22 is returned elastically by an angularly-acting spring 24 to its position of rest. Advantageously, this spring 24 is rated so that, in returning to its position of rest, the articulated transmission member 22 automatically returns the operating lever handle 14 to its position of rest, via the peg 20, as soon as the user releases the operating lever handle 14.

The handle 10 also comprises a switch (not depicted in detail) which is arranged, for example, inside a housing 26 which forms part of the handle support 12 and which is intended to be switched between an open state and a closed state by a lever 28.

In the embodiment illustrated in FIGS. 1 and 2, the lever 28 is a lever which is mounted so that it can pivot on the support 12 about the axis A2 of rotation of the articulated transmission member 22, in the longitudinal continuation and forward thereof.

The lever 28 can thus pivot, under the action of a stud 42 that belongs to an operating arm of the articulated lever 22, from an inactive position illustrated in FIG. 1 into an active position illustrated in FIG. 2, and is urged toward the latter position by an angularly-acting helical spring 30.

For information about the detailed operation of the handle according to the state of the art illustrated in FIGS. 1 and 2 reference may advantageously be made to the content of French patent application No. 99.01396 filed on Feb. 5, 1999.

According to the teachings of the invention, the lever handle 14 does not act directly on the transmission lever 22, but acts on the latter via means that constitute a disengageable mechanism.

More specifically, the lever handle 14 acts on an articulated transverse plate 49 which has two radial arms—a lower arm 50 and an upper arm 52—which are coplanar, extending in a plane perpendicular to the horizontal axis A2 by which the lever handle is articulated to the stationary support 12.

Because of the presence of the spring 24, the lever handle 14 and the plate 49 move together as one, that is to say, from a functional point of view, that the plate 49 may be considered as belonging to the lever handle 14 so as to act on the articulated transmission lever 22.

The lower arm 50 is an actuating arm on which the peg 20 acts, while the upper arm 52 is a motion-transmitting arm and is connected to the articulated transmission lever 22 via a tension spring 56 which is a spring for storing up energy within the meaning of the invention.

The articulated transmission lever 22 comprises an approximately horizontal branch 58 which extends from the axis of articulation, here produced in the form of a horizontal articulation spindle, borne by the stationary support 12, common to the lever handle 14 and to the transmission lever 22, toward the outside of the opening leaf.

The horizontal branch 58 continues vertically downward in the form of a vertical branch 60, at the lower end 62 of which has been depicted the attachment of the end of a motion-transmitting cable 64 that forms part of the linkage that transmits motion between the lever handle 14 and the lock (not depicted).

The upper end 55 of the spring 56 is attached to the free end of the upper transverse arm 52 of the plate 49 associated with the lever handle 14, while its lower end 57 is attached in the region of the elbow 61 where the horizontal 58 and vertical 60 branches of the articulated transmission lever 22 meet.

The two arms 50 and 52 of the plate 49 are in the form of a vertical plate perpendicular to the axis of articulation A2 and the rear lateral face 51 of the articulated plate 49 common to the two arms is adjacent to the front lateral face 59 of the horizontal branch 58 of the articulated transmission lever 22 which is also produced in the form of a vertical plate.

Figure 6:
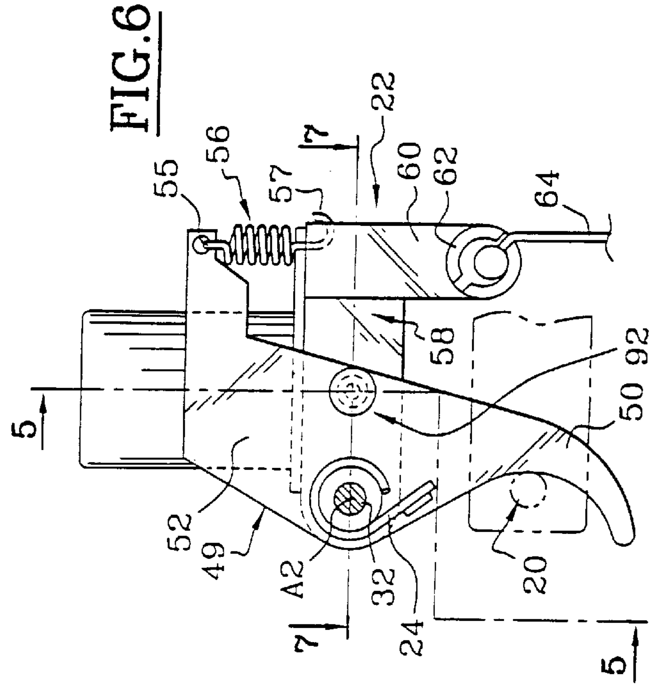
FIG. 6 is a diagrammatic view from the right in the direction of arrow F6 of FIG. 5.
Figure 5:
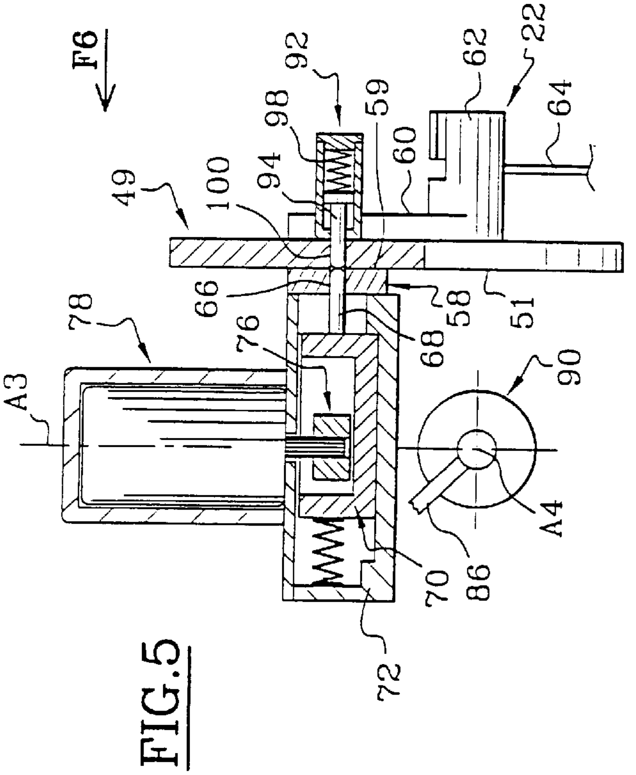
FIG. 5 is a simplified diagrammatic view of the components of FIG. 4, in the assembled position, and in part section on a vertical plane, the components being illustrated in the position of rest of the lever handle with the immobilizing carriage in the forward disengaged position by immobilizing the articulated transmission lever in the position of rest thereof that corresponds to the lock being locked.
Figure 7:
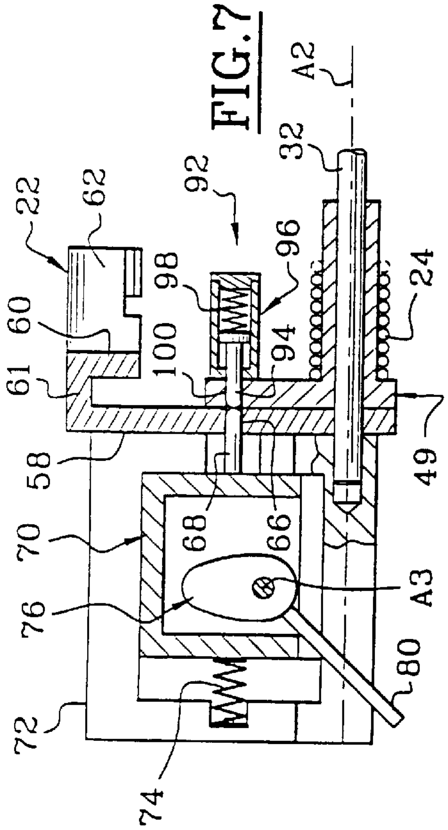
FIG. 7 is a diagrammatic view from above, with partial cutaway, in the direction of arrow F7 of FIG. 5.

According to the teachings of the invention, the horizontal branch 58 of the transmission lever 22 has an open hole 66 which extends in a horizontal direction parallel to the axis of articulation A2 and which first of all constitutes a hole for preventing the rotation of the horizontal branch 58, that is to say for preventing the rotation of the articulated transmission lever 22 in its position of rest depicted in particular in FIGS. 5 to 7.

The immobilizing hole 66 can take an immobilizing finger 68 which is mounted so that it can slide with respect to the stationary support 12 in a horizontal axial direction parallel to the axis of articulation A2 and which belongs to a motorized immobilizing carriage 70.

Figure 13:
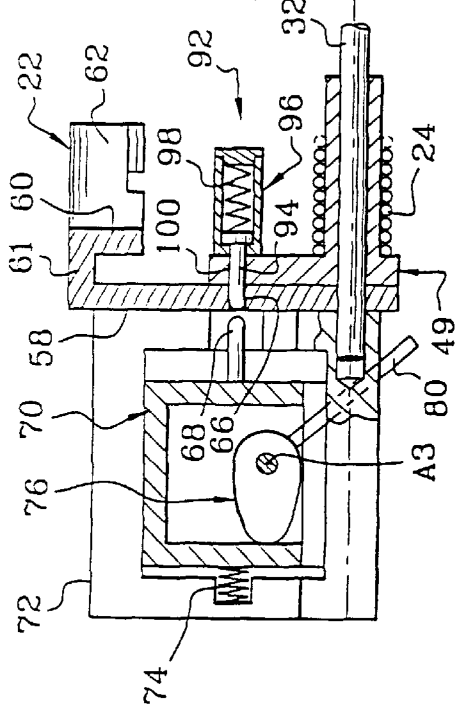

The immobilizing carriage 70 is mounted so that it can slide axially and horizontally in a housing 72 in which it is guided in its sliding in both directions between an extreme retreated rear position depicted in FIG. 13 and an extreme advanced forward position, depicted in FIG. 7, toward which it is constantly elastically urged by a return spring 74 which in this instance is a helical compression spring mounted between parts facing one another belonging respectively to the immobilizing carriage 70 and to the housing 72.

Thus, under the action of the carriage spring 74, the carriage is urged axially, to the right when considering FIGS. 5 and 7, into a position of abutment in the housing 72, in which position the immobilizing finger 68 projects axially forward out of the housing 72 to be housed in the immobilizing hole 66 in the horizontal branch 58 of the articulated transmission lever 22.

The movements of the immobilizing carriage 70 in both directions are brought about by an operating cam 76 which is mounted to rotate about a vertical axis A3 and which can be rotated in both directions by a geared motor unit 78 fixed to the housing 72 and the rotation in both directions of which is controlled by the antitheft unit (not depicted) of the vehicle.

Through its ovoid cam profile, the cam 76, by rotating in the counterclockwise direction about the axis A3 when considering FIG. 7, can cause the guide carriage 70 to move from right to left when considering FIG. 7, against the force applied by the carriage spring 74 or may alternatively cause the carriage 70 to move from left to right, when considering FIG. 13, the cam 76 then rotating for this purpose about the axis A3 in the clockwise direction.

Figure 16:
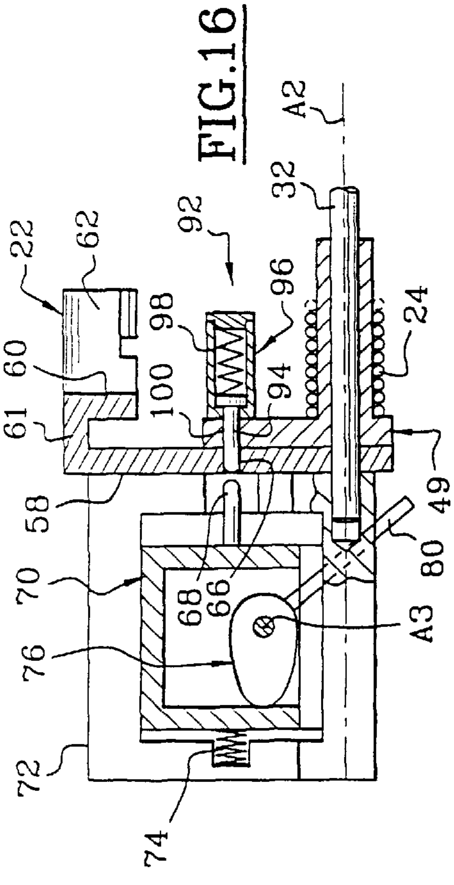

Depending on which of the two opposed angular positions the cam 76 is in, the immobilizing carriage 70 will occupy one or the other of its two opposed extreme axial positions illustrated in particular in FIGS. 7 and 13 and, correspondingly, the immobilizing finger 68 will occupy one or other of its two opposed extreme axial positions which are, respectively, its deployed forward disengagement position illustrated in FIG. 16 in which its front free end is housed in the immobilizing hole 66, and its retracted rear extreme axial engagement position in which its free end is entirely out of the immobilizing hole 66.

As has been depicted diagrammatically in the figures, the cam 76 comprises a radial drive rod 80 which rotates with it and which projects from the housing 72, through an opening 82 therein, extending in a horizontal plane perpendicular to the axis A3, so that the free end portion of the drive rod 80 is housed in a fork 84 formed at the radial free end of an arm 86 which is rotated in both directions by a rotary output member 88 belonging to a mechanical latch 90 with which the handle according to the invention is also equipped.

It is thus possible for the cam 76 to be rotated manually in both directions using the latch 90, the axis of rotation A4 of which is horizontal and perpendicular to the axis A3 and to the axis A2.

Finally, according to the invention, means 92 are provided for indexing the plate 49 associated with the lever handle 14 with respect to the transmission lever 22 to cause these two parts to rotate as one to allow normal use of the handle to unlock the opening leaf once the initial security opening operation has been performed.

These means 92 essentially consist of an indexing finger 94 borne by a housing 96 belonging to the articulated plate 49.

The housing 96 carried by the plate 49 accommodates, with axial sliding in both directions, the indexing finger 94 which is constantly elastically urged backward in the axial direction parallel to the axis A2 by an indexing spring 98 which constantly pushes it to the left when considering, for example, FIGS. 5 and 7.

Aligned with the housing 96, the plate 49 has a hole 100 through which the indexing finger 94 extends, which finger can thus project axially rearward, that is to say to the left when considering FIGS. 5 and 7, so that its rear free end faces the front lateral face 59 of the horizontal branch 28 of the articulated transmission lever 22.

The dimensions of the immobilizing finger 94 are such that this finger can be housed in the hole 66 in the articulated transmission lever 22, 58 which, in the embodiment depicted in the figures, constitutes both the immobilizing hole and the hole for indexing the articulated transmission lever 22.

According to an alternative form which has not been depicted, the immobilizing and indexing holes may be produced in the form of two separate holes, each one intended to receive, in the case of one of them, the immobilizing finger 68 and, in the case of the other, the indexing finger 94.

The way in which the handle of the vehicle antitheft security system works will now be described, starting from the position illustrated in FIGS. 5 to 7.

In this position, the lock (not depicted) is locked, the lever handle 14 with the plate 49 and the articulated transmission lever 22 are in their position of rest, and the immobilizing carriage 66 is in its retreated rear disengagement position by immobilizing the articulated transmission lever 22 in which the immobilizing finger 68 is housed in the hole 66 to prevent the transmission lever 22 from rotating about its axis of rotation A2.

When a user approaches the vehicle, he, in the known way, triggers the interrogation process aimed at determining whether he is an authorized user.

For example, the process is triggered either by the user bringing his hand up close to the handle or inside the lever handle part, or may also be triggered by a switch as mentioned earlier with reference to the state of the art.

The user's natural movement then consists in acting on the lever handle to rotate it and cause simultaneous rotation of the plate 49, in the counterclockwise direction when considering FIG. 6, against the force applied by the spring 24 to the articulated plate 49 and to the lever handle 14.

This rotational movement of the plate 49 continues until the lever handle 14 and the plate 49 are in their common position of opening illustrated in FIGS. 8 to 10.

Because the articulated transmission lever 22 is prevented from rotating by the immobilizing finger 68, the action by the user on the lever handle 14 does not cause the articulated transmission lever 22 to rotate at all, and therefore has no action on the lock.

This is because the mechanism consisting of the articulated plate 49 and the transmission lever 22 is disengaged within the meaning of the invention.

During this time, without the user having released his action on the lever handle 14, the antitheft unit determines whether he is an authorized user.

If he is, the antitheft unit transmits a command to the motor 78 to drive the cam 76 which then causes the cam to rotate in the counterclockwise direction from the position it occupies in FIG. 10.

This rotation, in this instance through one quarter of a turn or 900, causes the immobilizing carriage 70 to move from right to left when considering FIG. 10, to end up in the retreated rear position of the carriage 70 and of the immobilizing finger 68, which position is illustrated in particular in FIG. 13.

Figure 12:
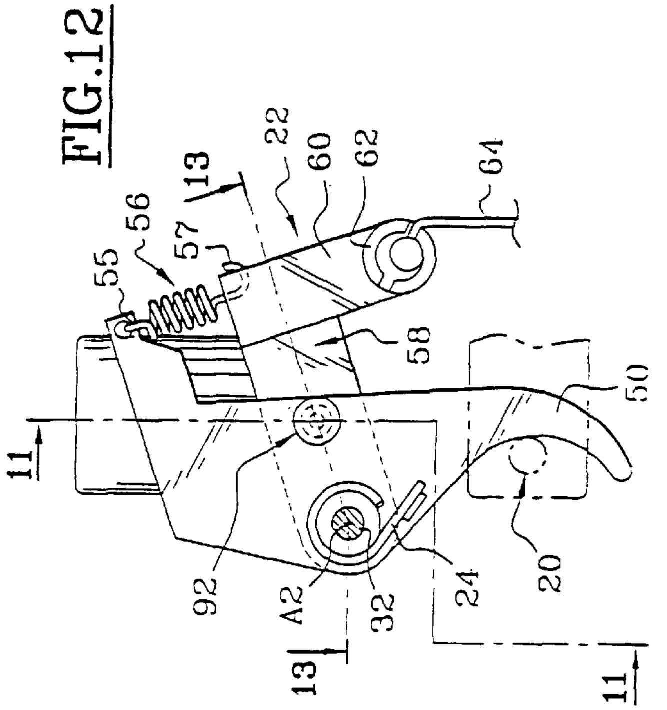
FIGS. 11 to 13 are views similar to those of FIGS. 5 to 7, in which the lever handle and the transmission lever are illustrated in a position for unlocking the lock with the immobilizing carriage in a retracted or retreated rear engagement position by releasing the articulated transmission lever.

As soon as the front axial end of the immobilizing finger 68 comes out of the immobilizing hole 66, the articulated transmission lever 22 is free to pivot, in the clockwise direction when considering FIG. 12, under the action of the spring 56 which has already stored up some energy as a result of the rotary angular displacement of the branch 52 of the plate 49 with respect to the articulated transmission lever 22.

The tension spring 56 therefore restores the energy it has stored up so as to cause the transmission lever 22 to rotate and act on the lock via the cable 64.

The position of opening of the articulated transmission lever 22, which position is illustrated in particular in FIG. 12, with respect to the plate 49 and with respect to the branch 52, is determined by the vertically oriented part 61 connecting the branches 58 and 60 coming into abutment against an edge facing it belonging to the plate 49.

Figure 11:
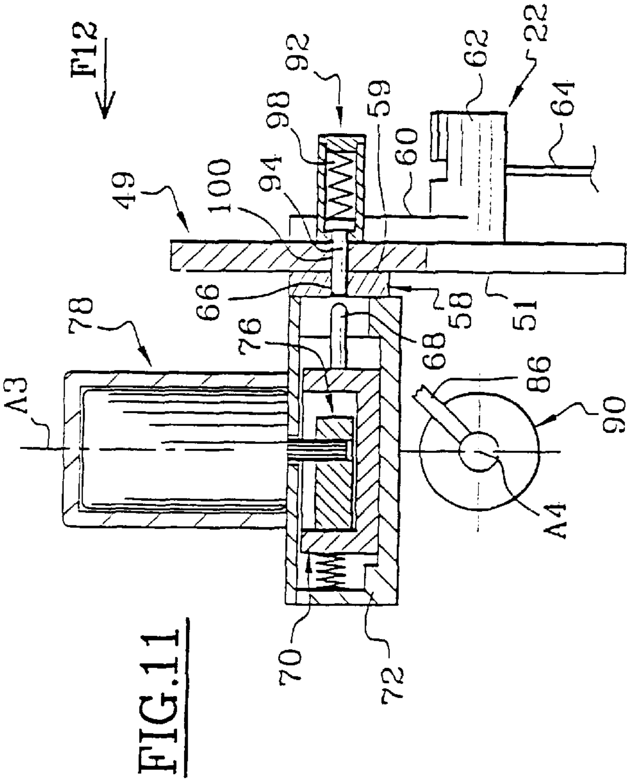
Figure 15:
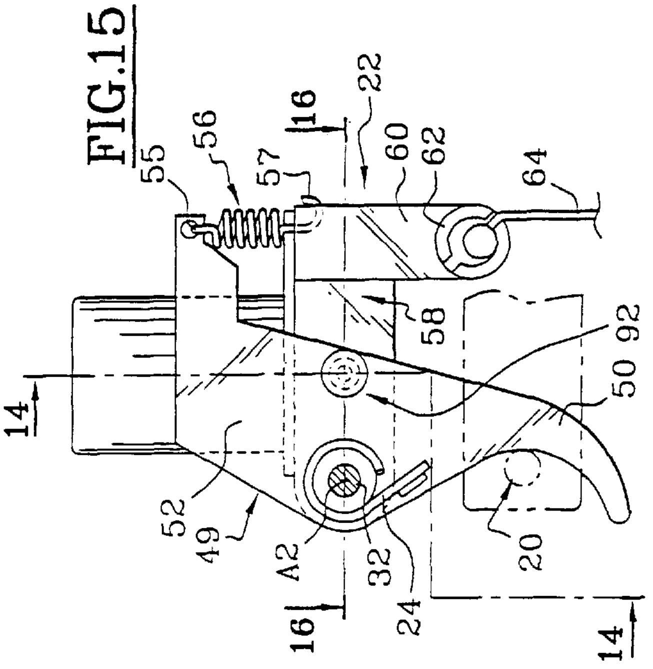
FIGS. 14 to 16 are views similar to those of FIGS. 5 to 7, in which the lever handle and the articulated transmission lever are illustrated in the position of rest with the immobilizing carriage in the retreated position for releasing the articulated transmission lever.
Figure 14:
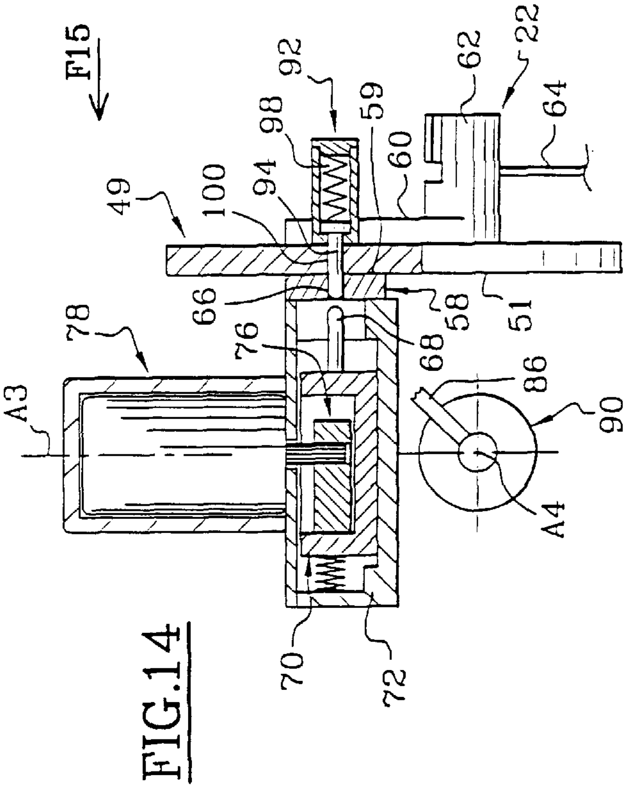

In the position illustrated in FIGS. 11 to 13, an initial security opening of the lock, that is to say an opening operation in which the user's identity has been verified, is performed, and the user can release his action on the lever handle 14 which, together with the plate 49, returns to its position of rest illustrated in FIGS. 14 to 16.

The fact that a security opening of the lock has occurred can be detected by touch by the user who feels a slight jolt through the articulated transmission lever 22 when the spring 56 returns to its initial compressed state, releasing the energy it has stored. This indication may also be provided to the user visually, via a light indicator set out near to the handle or incorporated into the body of the handle.

In its return movement, in the clockwise direction about the axis A2 when considering FIG. 12, the plate 49 carries the articulated transmission lever 22 along in rotation as one with it because the indexing finger 94 has already automatically entered the hole 66 when, when the two components were in the position for opening (FIGS. 11 to 13), the plate 49 and the transmission lever 22 found themselves in a relative angular position in which the hole 66 was once again facing the hole 100 and the indexing finger 94.

The two parts 49 and 22 henceforth rotate as one while the indexing finger 94, under the action of its indexing spring 98, extends both through the hole 100 and through the hole 66, which acts as the indexing hole.

Starting out from the position illustrated in FIGS. 14 to 16, if the user, via the antitheft unit, locks the opening leaves of the vehicle and, in particular, the opening leaf which has the handle 10, the antitheft unit, via the motor 78, rotates the cam 76 in the clockwise direction about the axis A3 so as to cause a corresponding movement, from left to right when considering FIG. 16, of the immobilizing carriage 66 and therefore of the immobilizing finger 68, all this being under the action of the carriage spring 74.

Because the carriage 70 moves axially forward into a disengagement position, all the components are once again in the position illustrated in FIGS. 5 to 7, that is to say that the immobilizing finger 68 is once again in the immobilizing hole 66.

The relative positioning of the plate 49 and of the articulated transmission lever 22, and therefore the relative positioning of the holes 66 and 100, is such that the immobilizing finger 68 and the indexing finger 94 are axially aligned when the plate 49 and the articulated transmission lever 22 are in their common position of rest or of closure, the immobilizing finger 68 then driving the indexing finger 94 out of the hole 66 to disengage the mechanism once more, that is to say once more to disconnect the plate 49, and therefore the lever handle 14 in terms of rotation from the articulated transmission lever 22.

In the event of a fault with the antitheft unit or with the motor 78, the user can of course still open the lock by acting on the cylinder latch 90 so as to cause the output member 88 and the arm 90 to rotate in the clockwise direction, when considering FIG. 5, about the axis A4 so as to cause the immobilizing carriage 68 to move toward its rear axial position illustrated in particular in FIGS. 11 and 12 to free the articulated transmission lever 22 in terms of rotation and simultaneously cause it to rotate as one with the plate 49 and therefore with the lever handle 14 by virtue of the indexing finger 94 which can then enter the hole 66.

In this scenario, following action on the latch, the handle then behaves like a conventional mechanical handle that acts on the lock via the plate 49, the articulated transmission lever 22 and the cable 64, and does so independently of any defective operation of the antitheft unit.

The design according to the invention, envisaging mechanical relative disengagement of the lever handle 14 and the articulated transmission lever 22, allows optimum management of the entire unlocking process from a temporary standpoint, that is to say from the standpoint of the sequencing of the various phases involved in unlocking.

The invention is not restricted to the embodiment just described.

In particular, the lever handle could be of any kind and articulated with respect to the opening leaf about an axis oriented in any direction.

The plate 49 may also be made as a single piece with the lever handle.

Whatever the particular design of lever handle, implementing the principle of the invention simply entails the provision of actuated disengageable means acting between the "driving" element of the lever handle on which the user acts manually by applying force to it, and a member that transmits toward the lock the motion and force that is applied to the lever handle.

What is claimed is:

1. A handle (10) for operating an opening leaf of a motor vehicle, which is equipped with a security system which locks the opening leaf and the locking and unlocking of which are subordinated to a remote interrogation, by a vehicle antitheft unit, of an identifier, carried by a user, wherein before triggering unlocking, the antitheft unit emits an interrogation signal and waits for a response signal to be returned, the response signal being emitted by the identifier, and which response signal it compares with a predetermined signal and, if the response signal and predetermined signal correspond, then at that instant, triggers the unlocking, the handle (10) comprising an operating lever handle (14) which is moveable by the user from a position of rest into a position for opening, and a transmission member (22) which normally moves with the lever handle (14) from a position of rest into a position of opening and which is connected to a linkage (64) for operating the lock, wherein the transmission member (22) is connected to the lever handle (14) by a disengageable mechanism (49, 22, 68, 66), the engagement of which is brought about by the antitheft unit when it detects said correspondence between the response and predetermined signals and which, in a disengaged state, stores up at least some of the mechanical energy of opening applied to the lever handle by the user so as to then restore this energy to the transmission member during engagement.

2. The handle as claimed in the preceding claim 1, wherein the disengageable mechanism comprises a motorized finger (68) for immobilizing the transmission member (22), which is made to move between a deployed forward disengagement position in which it immobilizes the transmission member (22), and a retracted rear engagement position in which the transmission member (22) is free to move under the action of a spring (56) that stores up energy and that connects the lever handle (14, 49) to the transmission member.

3. The handle as claimed in claim 2, wherein the spring (56) that stores up energy, is a tension spring which is tensioned in order to store up energy when the immobilizing finger (68) is in the deployed disengagement position and when the user moves the lever handle (14, 49) from its position of rest toward its position for opening.

4. The handle as claimed in claim 1, wherein the front free end of the motorized immobilizing finger (68) can be housed in a corresponding immobilizing hole (66) in the transmission member (22).

5. The handle as claimed in claim 3, wherein the transmission member is a transmission lever (22) mounted in an articulated manner about a fixed spindle.

6. The handle as claimed in claim 5, wherein the opposed free ends (55, 57) of the tension spring are each fixed to the end of a radial arm (52, 58) of the lever handle (14, 49) and of the transmission lever (22), respectively.

7. The handle as claimed in claim 6, wherein the motorized finger (68) that immobilizes the transmission lever (22) is able to move in terms of translation in a direction parallel to the fixed spindle about which the transmission lever (22) is articulated.

8. The handle as claimed in claim 4, and which comprises indexing means (92, 94, 96, 100) which automatically secure the transmission member (22) and the lever handle (14, 49) at the end of the security unlocking of the opening leaf.

9. The handle as claimed in claim 8, wherein the automatic indexing means comprise an indexing finger (96) borne by the lever handle (14, 49) and with respect to which it is mounted so that it can slide between a retracted forward position and a projecting rear position, toward which it is elastically returned (98), in which its rear free end can enter a corresponding indexing hole (66) formed in the transmission member (22).

10. The handle as claimed in claim 9, wherein the immobilizing hole and the indexing hole consist of one and the same open hole (66) formed in the transmission member (22, 58) and, when the lever handle is in the position of rest, causing the motorized finger (68) that immobilizes the transmission member to move toward its deployed forward disengagement position, causes the indexing finger (94) to slide toward its retracted forward position.

11. The handle as claimed in claim 2, wherein the motorized immobilizing finger (68) is borne by an operating carriage (70) mounted so that it can slide between two opposed positions toward one of which it is elastically returned, and the movements of the carriage (70) are caused by a rotary operating cam (76) which is rotated in both directions by an electric motor (78).

12. The handle as claimed in claim 11, wherein the operating carriage (70) is returned elastically (74) toward its extreme position that corresponds to the deployed forward disengagement position of the motorized immobilizing finger (68).

13. The handle as claimed in claim 2, and which is associated with a manual latch (90) and wherein a rotor (88) for deploying the latch is capable of making the immobilizing finger (68) move.

14. The handle as claimed in claim 1, wherein the lever handle is returned elastically (24) toward its position of rest.

15. A handle for operating an opening leaf of a motor vehicle in combination with a security system;

said handle comprising;

an operating lever handle which is moveable by a user from a position of rest into a position for opening; and a transmission member which normally moves with the lever handle from a position of rest into a position of opening and which is connected to a linkage for operating the lock, a disengageable mechanism disposed between said transmission member and said operating lever and selectively operable to selectively disengage a connection between said handle and said lock to prevent unauthorized opening of said lock;

said security system including;

an antitheft unit capable of emitting an interrogation signal; and an identifier capable of sending a response signal in response to said interrogation signal;

wherein operation of the disengageable mechanism is controlled by said antitheft unit in response to detection of correspondence between the response signal and a predetermined signal, and when in a disengaged state said disengageable mechanism stores up at least some mechanical energy applied to the lever handle by the user during opening and then restores this energy to the transmission member during subsequent engagement of said disengageable mechanism to facilitate opening of said lock.

* * * * *